United States Patent [19]

Sauermilch

[11] 4,378,900
[45] Apr. 5, 1983

[54] MACHINE WITH FINGERGUARD

[75] Inventor: Otto Sauermilch, Stolberg, Fed. Rep. of Germany

[73] Assignee: William Prym-Werke KG, Stolberg, Fed. Rep. of Germany

[21] Appl. No.: 136,965

[22] Filed: Apr. 3, 1980

[30] Foreign Application Priority Data

Apr. 14, 1979 [DE] Fed. Rep. of Germany ....... 2915327

[51] Int. Cl.³ .................... B21J 15/10; B21J 15/28
[52] U.S. Cl. ................................ 227/8; 227/53; 227/55; 227/142; 227/154; 227/151
[58] Field of Search ............... 227/1, 8, 51, 53, 55, 227/56, 61, 62, 124, 142, 154, 151, 155

[56] References Cited

U.S. PATENT DOCUMENTS

| 201,192 | 3/1878 | Morse | 227/142 |
| 734,823 | 7/1903 | Coombs | 227/55 |
| 830,303 | 9/1906 | Coombs | 227/61 |
| 3,072,279 | 7/1963 | Ikelheimer | 227/55 |
| 4,122,988 | 10/1978 | Casott | 227/53 |

FOREIGN PATENT DOCUMENTS 2556516  6/1977  Fed. Rep. of Germany .

Primary Examiner—Paul A. Bell
Attorney, Agent, or Firm—Michael J. Striker

[57] ABSTRACT

An operator-tended machine, e.g., a machine for applying snap fasteners, rivets or the like to workpieces, has an upper tool which moves against a lower tool acting as an anvil for it. A fingerguard moves ahead of the upper tool to protect the fingers of an operator. A workpiece support, with reference to which the prescribed safety distance of the fingerguard is calculated, can move downwardly and yield to the upper tool against a biasing force.

7 Claims, 7 Drawing Figures

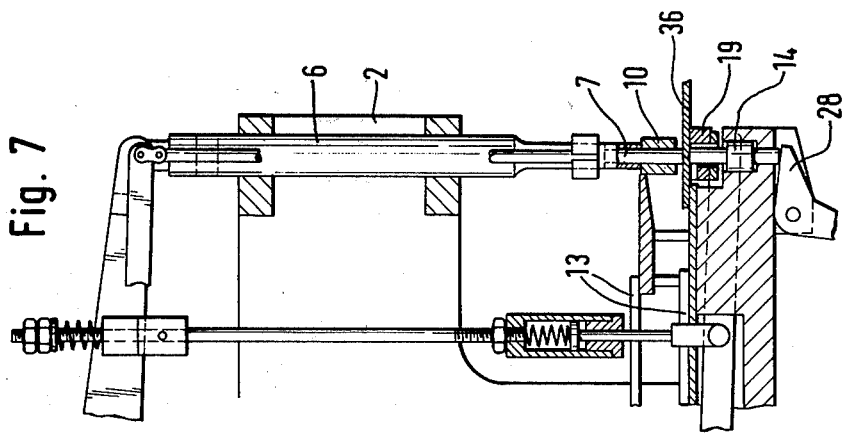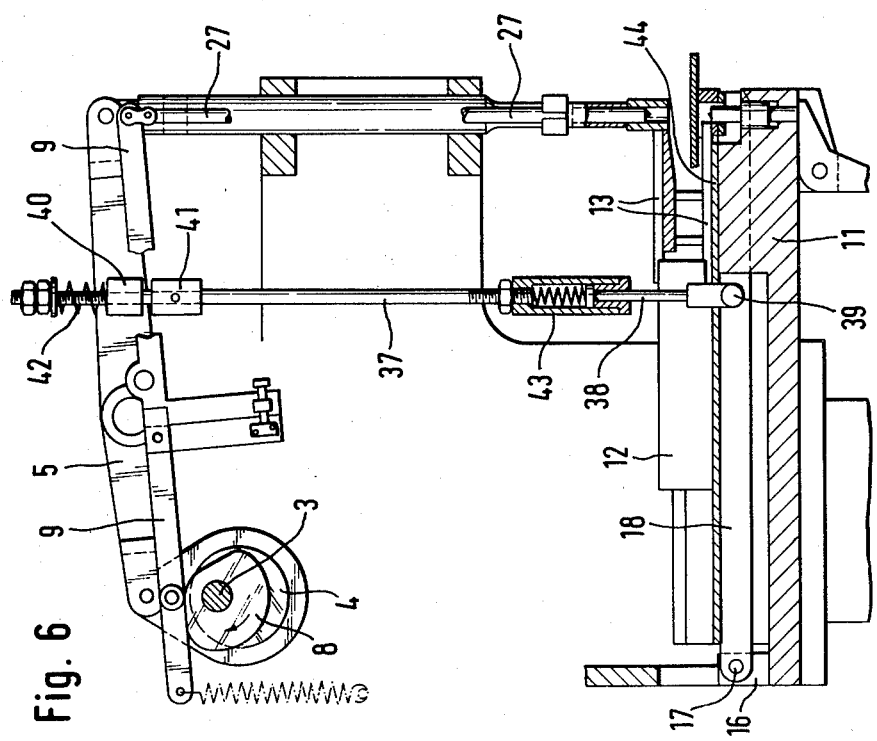

MACHINE WITH FINGERGUARD

BACKGROUND OF THE INVENTION

This invention relates to an operator-tended machine having a protective fingerguard.

Operator-tended machines are known—for example machines for securing snap fasteners, rivets and the like to workpieces—in which a fingerguard is provided which also holds down the workpiece and controls the machine drive in dependence upon its position relative to the workpiece support (Published German Application 2,556,516). The workpiece support is provided on a rigid arm of the machine; the same arm also carries the stationary lower tool of the cooperating tool set of the machine. It follows that the workpiece support cannot move relative to the lower tool.

This arrangement is satisfactory as long as the overall height of workpieces to be processed is not too substantial. Once this height exceeds a certain dimension, however, and the fingerguard is lowered from above onto the workpiece resting on the support, the processing operation by the machine may already have to start when the upper tool and fingerguard are still spaced from the workpiece support by a distance which is greater than the permissible safety distance. In such an event the fingerguard will not allow the machine to operate, since it will encounter the workpiece during descent towards the support and react to it as a danger to the operator, i.e., by preventing machine operation. This means that on a machine of the type mentioned above tall workpieces cannot be processed, unless the drive arrangement for moving the fingerguard is so modified that the permissible safety distance is related not to the surface of the workpiece support, but instead to a level located higher than this surface. Of course, this requires machine alterations, which is time-consuming; moreover, these alterations must be reversed again if the same machine is subsequently to be able to operate again on workpieces which are less tall.

SUMMARY OF THE INVENTION

It is an object of the present invention to avoid the disadvantages of the prior art.

A more particular object is to provide an improved operator-tended machine wherein the workpiece support is displaceable relative to the lower tool and wherein this displacement is controlled in dependence upon the movement of the upper tool carrier, in such a manner that the safety distance of the fingerguard is automatically maintained relative to the rigid machine arm.

Still a further object is to provide such an improved machine which is of relatively simple construction and offers substantial operating reliability.

In keeping with these objects, and with still others which will become apparent hereafter, one aspect of the invention resides in an operator-tended machine having a fingerguard. According to the invention such a machine for applying snap fasteners or the like may comprise a workpiece support for a workpiece; a lower tool and a cooperating upper tool; movable first means mounting the upper tool for downward movement towards the lower tool and workpiece support; second means mounting the lower tool with limited freedom of receding from the approaching downwardly moving first means; biasing means for resiliently resisting the receding of the lower tool; and third means mounting the workpiece support for movement between at least an upper and a lower end position as a function of the movement of the first means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 6 is a view analogous to that in FIG. 2, but illustrating another embodiment; and FIG. 7 is a view analogous to that in FIG. 4, but of the embodiment shown in FIG. 6.

DESCRIPTION OF THE PREFERRED EMBODIMENTS

Figure 1:
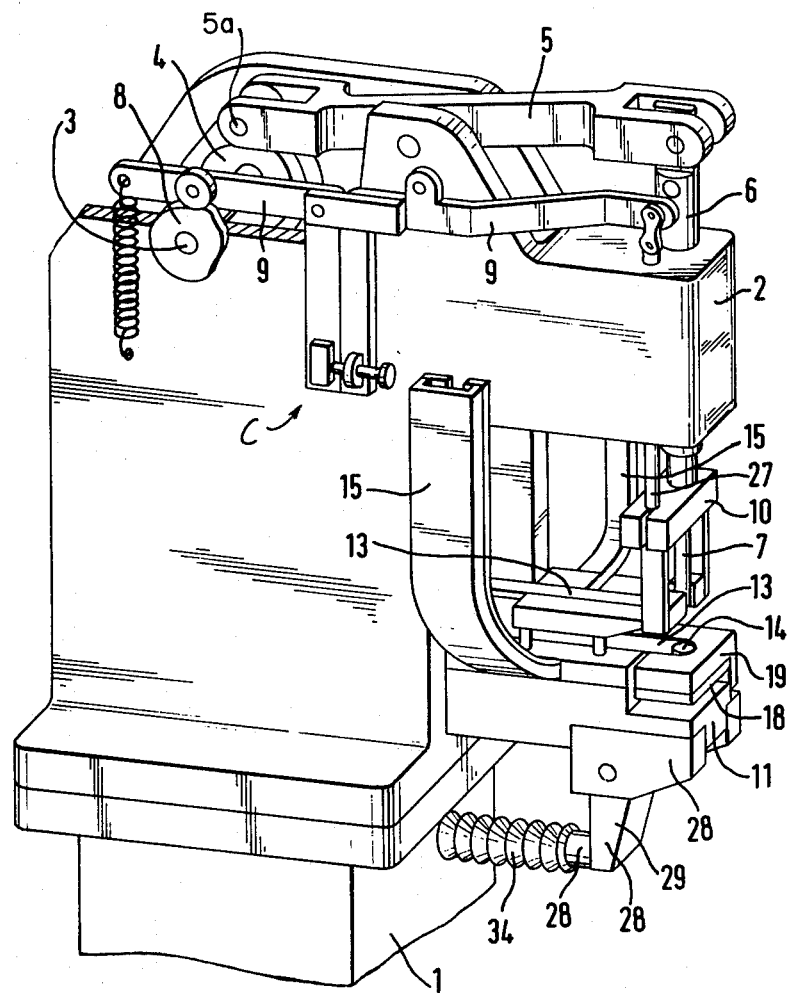
FIG. 1 is a perspective view, illustrating a machine incorporating a first embodiment of the invention.

A machine (for securing e.g. rivets, snap fasteners, eyelets or the like to workpieces) incorporating a first embodiment of the invention is illustrated in FIGS. 1–5. The machine has a base or support 1 on which the machine housing 2 is mounted at a level convenient for tending by an operator. Mounted laterally of the housing 2 are suitable magazines (not illustrated, because known per se) which supply the components to be processed by the machine; these components slide in known manner along guide rails or chutes 15 (one shown) to the inserting mechanism 13 which is mounted in the slide 12.

The machine has two cooperating tools, namely an upper tool 7 and a lower tool 14; the cooperation of these tools is needed to secure a respective component (e.g. eyelet) to a workpiece. The upper tool 7 is mounted on a vertically moving plunger 6 which, after completion of a (downward) working stroke is returned to its upper starting position either by being positively driven or by the action of a restoring spring (not shown). A cantilevered rigid arm 11 of the machine carries at its front portion a workpiece support 19 in which the lower tool 14 is mounted. The rear (inner) portion of the arm 11 is constructed as a guide for a slide 12. A fingerguard 10 is essentially clamp-shaped and has the additional function of holding down the workpieces; it surrounds the upper tool 7 and is connected—via connecting rod 27—with its own drive composed of a cam 8 mounted on the main machine drive shaft 3 and a bell crank 9 the movements of which are controlled by the cam 8. When the two parts of the bell crank move out of their relative position which is shown in FIG. 1, they break a circuit through the illustrated switching contact C (details are omitted because they are identical with the disclosure in German Published Application OS 2,556,516) and stop the machine. The working (downward) stroke of plunger 6 is controlled by the drive shaft 3 via an eccentric 4 which pivots a drive arm 5 about a pivot axis 5a; the plunger 6 is connected to the front end of the arm 5 and moves downwardly when arm 5 pivots in clockwise direction. The machine construction as thus far described corresponds to the disclosure of the aforementioned OS 2,556,516.

Unlike the prior art construction, however, the workpiece support 19 of the inventive machine is not rigidly mounted on the arm 11. Instead, it is mounted on one end portion of an arm 18 the other, remote end portion of which is provided with a transversely projecting pin or bolt 17 which is turnably journalled in a lug 16, so that the arm 18 can pivot about the axis defined by pin 17. Lug 16 is a part of arm 11 and the arm 18 may therefore be said to be mounted on as well as in the arm 11. The pivoting movement of the arm 18 is to be dependent on the movement of plunger 6; for this purpose the drive for the slide 12—which must anyhow be present in machines of this type—is used.

More specifically, the slide 12 is provided with a cam groove or cut-out 21 which is open at its forward end and cooperates with a cam follower roll 20 which is freely turnably mounted on arm 18 so as to project laterally from the same. The closed end portion of groove 21—i.e., the one facing towards pin 17—has upper and lower parallel guide faces which are spaced from one another by a distance corresponding substantially to the outer diameter of roll 20 so that the roll can just enter and rotate between them. The upper of these faces extends forwardly over the entire path of movement of the slide 12; the lower guide face, however, extends forwardly only to the illustrated extent and from there on recedes downwardly away from the upper guide face (see 21a in FIG. 3). This means that when the roll 20 is located in that part of groove 21 in which the upper and lower guide faces extend parallel, the pivot arm 18 and the workpiece support 19 thereon are held in their upper end position and blocked against downward movement. If, however, the roll 20 is located in the front end portion of groove 21, where the part 21a of the lower guide face is downwardly inclined, the roll 20 (and thereby the arm 18 with the workpiece support 19) can yield in downward direction under the force exerted by the plunger 6.

The slide 12 moves horizontally; this movement is derived from a bifurcated member 25 which is mounted on the plunger 6 and receives in its bifurcation space a roll 24 which is freely turnably secured to one arm of a double-armed lever 22. This lever is pivoted at 23 to the housing 2 or another stationary machine element; its lower end is bifurcated and engages a roll or a simple pin 26 extending laterally from the slide 12. Downward movement of the plunger 6 thus results in clockwise pivoting of lever 22 about pivot 23 and in corresponding rearward movement (left in FIGS. 1-3) of slide 12. At the beginning of the working stroke (compare FIG. 2) the slide 12 is in its front end position and the arm 18 with the workpiece support is locked in its upper position (due to the presence of roll 20 in the left-hand part of groove 21). As the plunger 6 begins to move downwardly, the slide 12 moves rearwardly (to the left) until it reaches the position of FIG. 3. During this time the arm 18 remains locked in its upper position, although the inserting tools 13 have already moved away from the operating station. During continued downward movement of plunger 6 and further retraction of slide 12, the roll 20 reaches the downwardly inclined face portion 21a of the groove 21 and can now yield in downward direction, together with the arm 18 on which it is mounted and with the workpiece support 19 which is mounted on the arm 18 (see FIG. 4).

It is self-evident that this yielding of arm 18 must be accompanied by a similar movement of the lower tool 14 on the fixed arm 11. To make this possible the tool 14 is so mounted in the arm 11 that it can move in the same direction as the plunger 6. During the actual affixing operation for which the tools 7, 14 are provided, the tool 14 must serve as an anvil for the tool 7; it therefore cannot be allowed to yield freely. Instead, its yielding in downward direction is opposed, i.e., in the embodiment of FIGS. 1-5 by spring means 34 which acts upon the lower end of tool 14 via an angular pressure-compensating arm 29 pivoted to the arm 11 at pivot 30 and having one part bearing upon the lower end of the tool 14. Preferably—although not necessarily—the spring means 34 is in form of a packet of dished (Belleville) springs mounted on a guide rod 35 and adjustable at to its degree of prestress. A clamping arm 31 (FIG. 5) is mounted on the pivot 30 and can be adjusted thereon to different angular positions (note slot 31a and screw 31b in FIG. 5). The front end of arm 31 carries a pin 32 which stops the downward movement of arm 18 on abutment therewith; by adjusting the angular position of arm 31 on pivot 30 the pin 32 can be moved higher or lower, i.e., the arrangement can be adjusted for workpieces of different heights or thickness. The spring-tension adjustment of spring means 34 (rod 35 may be of two threaded telescopable parts, or some other known solution may be used for the adjustment) provides an overload protection feature, in the sense that the counterpressure exerted upon the tool 14 by the lever 29 cannot become greater than the permissible degree of deformation of the components (e.g., a rivet) to be secured to the workpiece. If the machine is to be switched to operation with components having a different deformation characteristic, then it is merely necessary to readjust the pre-tension of the spring means 34 accordingly.

From the foregoing it will be appreciated that the arm 18 with its workpiece support 19 will be retained and locked in its upper position until the fingerguard 10—which is driven by the cam 8 to descend in advance of the plunger 6 and tool 7—has reached the prescribed safety distance from the workpiece support 19. Even if very tall or extremely tall (relative to the usual height) workpieces are to be operated upon, the desired finger protection is always assured since the deformation work by the tools 7, 14 is properly performed even in such circumstances, with the fingerguard 10 lowered but with the workpiece support 19 yielding downwardly. In other words: as pressure begins to be exerted upon the workpiece and component to be secured thereto, the workpiece support 19 can yield in downward direction by a distance which is at least equal to the workpiece height (or thickness) plus the length reduction of the neck of the component (e.g., of a rivet); this eliminates deformation of or damage to the workpiece. Due to the use of the lever 29, workpieces of different height (or thickness) can be acted upon without requiring readjustment of the machine.

Another embodiment of the invention is illustrated in FIGS. 6 and 7. This differs from the preceding embodiment in that the arm 18 is driven differently and the groove 21 is omitted.

In FIGS. 6 and 7 the arm 18 is driven via a two-part rod 37, 38 and a ball joint 39. The rod 37, 38 carries an entraining member 41 and slidably moves in an element 40 which is pivoted to the drive arm 5 for movement therewith. An expansion spring 42 reacts between arm 5 (or element 40) and to the upper end of the portion 37 of the rod 37, 38 so as to push the rod upwardly; in the starting position shown in FIG. 6 the entraining member 41 is therefore out of contact with the element 40.

When the machine is activated for its working stroke the fingerguard 10 moves downwardly ahead of the plunger 6 and upper tool 7; by the time the guard 10 reaches the prescribed safety distance from workpiece support 19 the plunger 6 has moved downwardly only to a slight extent and the arm 5 also has tilted only slightly, not enough for the two elements 40, 41 to move into engagement. Due to expansion of the precompressed spring 42 the arm 18 is still being maintained in its upper position.

During the further downward displacement of plunger 6 the element 40 abuts the member 41 and presses it downwardly, thereby causing the arm 18 (with the workpiece support 19) also to yield in downward direction. When arm 18 has reached its lowest permissible position it abuts against the pin 32 (FIG. 5); the remaining excess travel of the parts 37, 38 of the rod is absorbed by a springy length compensator 43 which is interposed between these two parts (FIG. 6). On return of the plunger 6 to its upper rest (starting) position, arm 5 also pivots back to its own starting position, the spring 42 returns arm 18 to the upper position and the length compensation via compensator 43 is negated. Abutment of arm 18 against the cover plate 44 (FIG. 6) defines the upper position of the arm 18.

Figure 2:
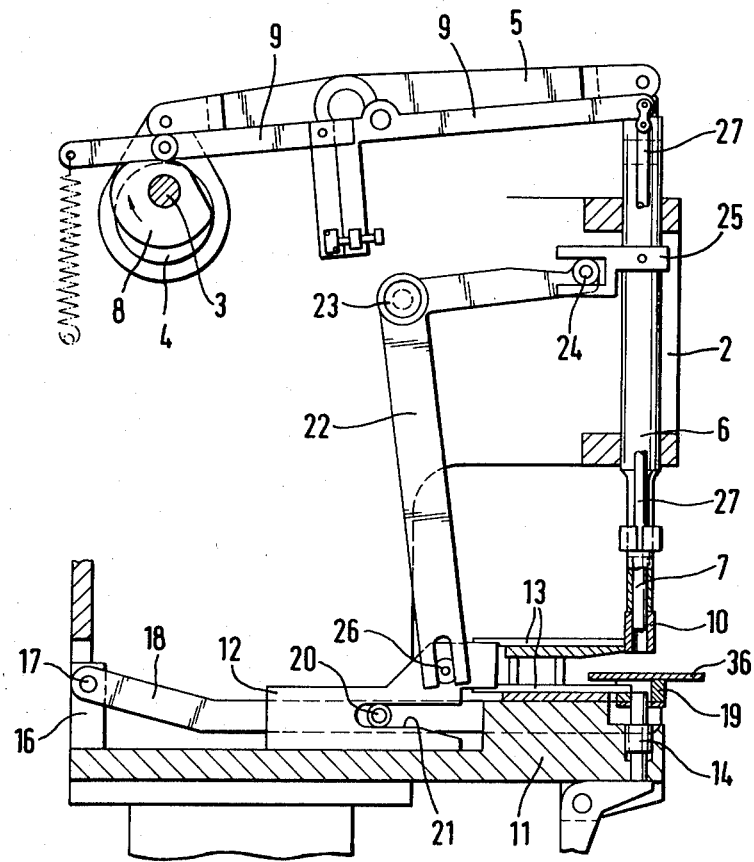
FIG. 2 is a fragmentary, diagrammatic, partly sectioned view showing those components of the machine in FIG. 1 which are necessary for an understanding of the invention, in the rest position prior to machine operation.
Figure 3:
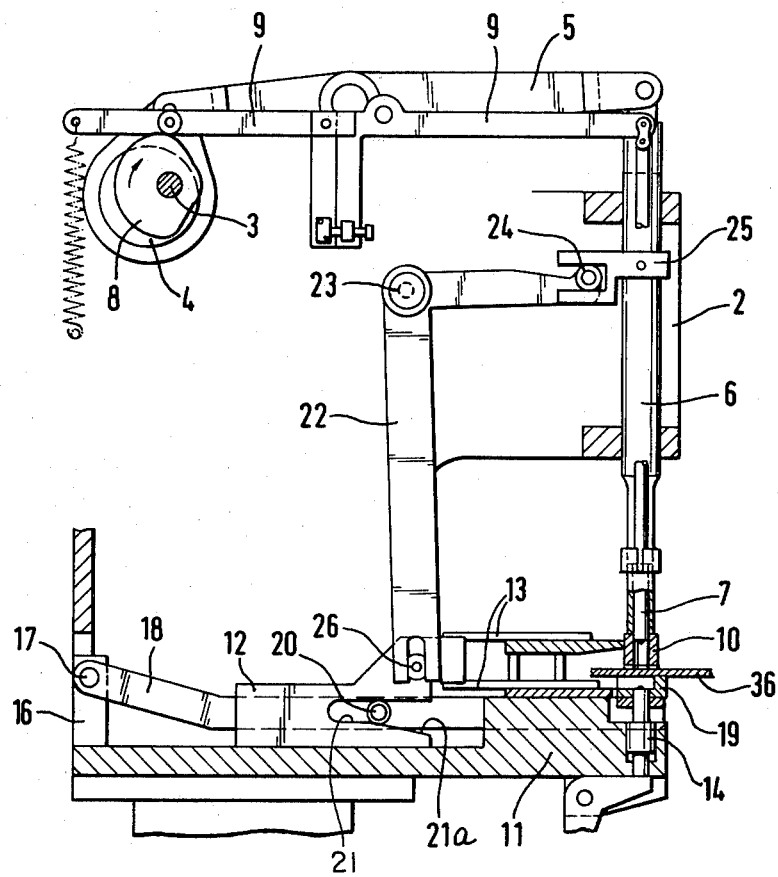
FIG. 3 is a view similar to FIG. 2 but showing the components in the positions which they assume near the start of a working stroke.

The operation of the machine will be understood from the description hereinbefore. Nevertheless, the operation of the FIGS. 1–5 embodiment will hereafter be briefly summarized, to further facilitate understanding of the invention:

The machine is shown in FIGS. 1–2 in its rest or loading position. After it is activated the fingerguard 10 moves downwardly, ahead of the plunger 6. By the time it has reached the prescribed safety distance from the workpiece support 10, the machine drive shaft 3 has performed only a small part of a revolution, so that the roll 20 is still in the narrow (left-side) portion of the groove 21 (FIG. 3) and the arm 18 in its upper position. The inserting tools, however, have already moved out of the working station, i.e., the location where the tools 7, 14 will subsequently act upon the workpiece.

Figure 4:
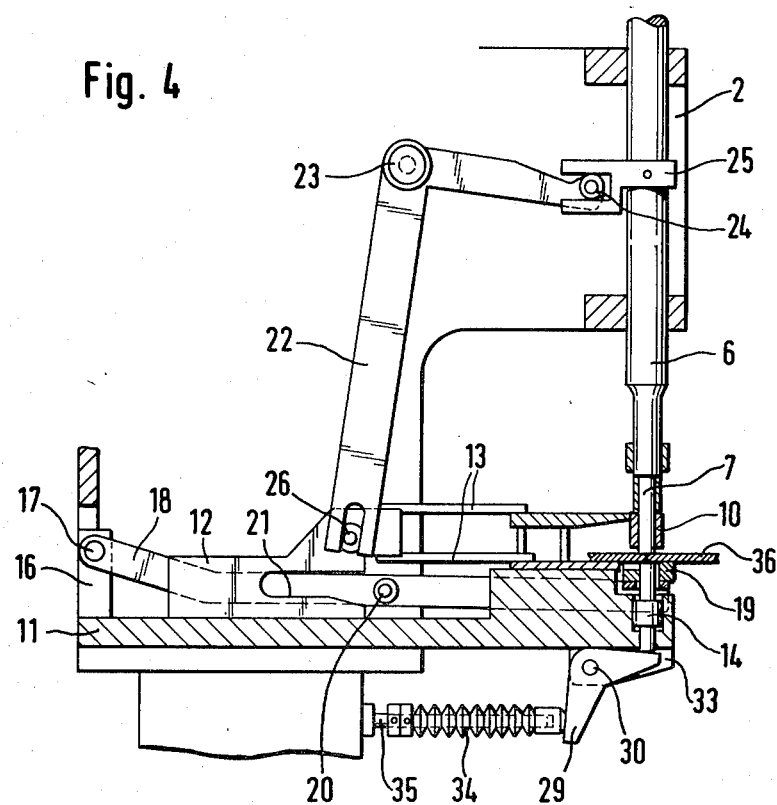
FIG. 4 is again a view similar to FIG. 2 but shows the components in the positions which they assume at the stroke end.
Figure 5:
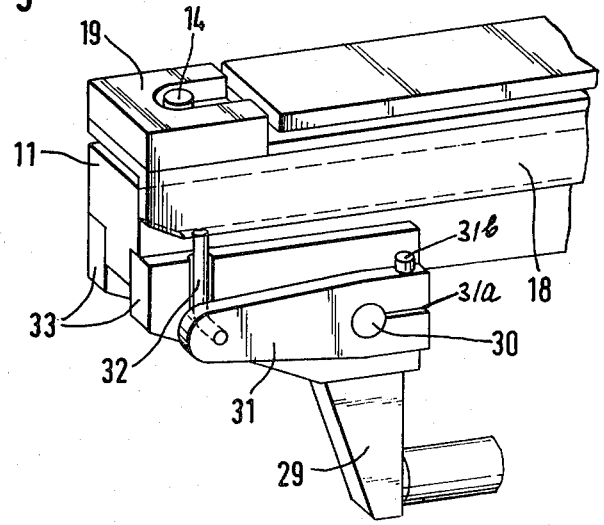
FIG. 5 is a somewhat diagrammatic fragmentary perspective view, showing a detail of the machine in FIGS. 1–4.

During further turning of the shaft 3 the plunger 6 continues to descend and, on encountering the component to be affixed to the workpiece (e.g., a part of a snap fastener to be affixed to a textile web) begins its deforming action. The roll 20 moves into the part of groove 21 having the face portion 21a and therefore allows arm 18 to descend, as shown in FIG. 4. During this movement the tool 14 in arm 11 yields downwardly, counter to the bias of the spring 34. Because the spring bias is high, the resistance which it opposes to the yielding of the tool 14 is sufficiently large to assure that the tool 14 (acting as anvil) in turn opposes the pressure of tool 7 sufficiently for the desired deformation of the component (snap fastener, rivet or the like) to occur.

After the working stroke is completed the tools 7, 14 return to their starting positions. If the machine operates in a single-step mode, the tools remain in these positions until the machine is again activated; if the machine operates in an automatic mode, the return of the tools to their starting positions readies the machine for automatic execution of the next working stroke. This, of course, is not a part of the invention.

The invention is susceptible of various modifications. For example, in all embodiments the several angled drive or motion-transmitting elements may be replaced with linear components.

While the invention has been illustrated and described as embodied in a machine for applying rivets, snap-fasteners and the like to workpieces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Machine, comprising a workpiece support for a workpiece; a lower tool and a cooperating upper tool; movable first means mounting said upper tool for downward movement prior to and during a working step towards said lower tool and workpiece support; a fingerguard surrounding said upper tool; fingerguard moving means operating as a function of said first means and mounting said fingerguard for downward movement prior to a working step toward said lower tool and said workpiece support so that said fingerguard moves downwardly ahead of said upper tool; second means mounting said lower tool with limited freedom of receding during the working step from the approaching downwardly moving first means; biasing means for resiliently resisting the receding of said lower tool during the working step; and third means mounting said workpiece support, said third means being connected to said first means for displacing said workpiece support between at least an upper and a lower end position as a function of the movement of said first means.

2. Machine as defined in claim 1, said third means comprising a tilt arm having one end portion pivoted to a stationary machine part, and another end portion carrying said workpiece, support and a drive linking said tilt arm with said first means.

3. Machine as defined in claim 2, said lower tool having a lower end; and said biasing means comprising a pressure-compensating lever, and spring means reacting between a stationary part of the machine and said lever.

4. Machine as defined in claim 3, said lever being a double-armed angled lever having a first arm and a second arm, and said spring means comprising a packet of dished springs on a guide rod and bearing against said second arm so as to resiliently urge said first arm into engagement with said lower end.

5. Machine, comprising a workpiece support for a workpiece; a lower tool and a cooperating upper tool;

movable first means mounting said upper tool for downward movement prior to and during a working step towards said lower tool and workpiece support; a fingerguard surrounding said upper tool; fingerguard moving means operating as a function of said first means and mounting said fingerguard for downward movement prior to a working step toward said lower tool and said workpiece support so that said fingerguard moves downwardly ahead of said upper tool; second means mounting said lower tool with limited freedom of receding during the working step from the approaching downwardly moving first means; biasing means for resiliently resisting the receding of said lower tool during the working step; third means mounting said workpiece support for movement between at least an upper and a lower end position as a function of the movement of said first means, said third means including a tilt arm having one end portion pivoted to a stationary machine part and another end portion carrying said workpiece support, and a drive linking said tilt arm with said first means; and a pivotable drive arm to which said first means are connected, said drive including a two-part rod mounted on said drive arm for pivoting about an axis parallel to the pivot axis of said drive arm and for sliding movement parallel to the movement of said first means; a ball-coupling connecting said rod to said tilt arm, means engageable with said drive arm upon partial pivoting of the same to effect sliding of said rod in response to further pivoting of said drive arm, and spring-biased means for compensating length variations of said rod.

6. Machine, comprising a workpiece support for a workpiece, a lower tool having a lower end and a cooperating upper tool; movable first means mounting said upper tool for downward movement towards said lower tool and workpiece support; second means mounting said lower tool with limited freedom of receding from the approaching downwardly moving first means; biasing means for resiliently resisting the receding of said lower tool; and third means mounting said workpiece support for movement between at least an upper and a lower end position as a function of the movement of said first means, said third means comprising a tilt arm having one end portion pivoted to a stationary machine part, and another end portion carrying said workpiece, support and a drive linking said tilt arm with said first means, said drive comprising a bifurcated member mounted on said first means for movement therewith, an angled lever pivoted to a stationary part of the machine and having one arm carrying a follower roll engaged in the bifurcation of said bifurcated member and another arm, a slide on said machine movable in a direction normal to said movement of said first means, means connecting said other arm with said slide so that the latter moves in said direction in response to pivoting of said angled lever, a groove in said slide extending in said direction and having one end portion of constant cross-section and another end portion provided with an open end and diverging in cross-section towards said end, and a roll on said tilt arm and received in said groove.

7. Machine, comprising a workpiece support for a workpiece; a lower tool an a cooperating upper tool; movable first means mounting said upper tool for downward movement towards said lower tool and workpiece support; second means mounting said lower tool with limited freedom of receding from the approaching downwardly moving first means; biasing means for resiliently resisting the receding of said lower tool; third means mounting said workpiece support for movement between at least an upper and a lower end position as a function of the movement of said first means, said third means comprising a tilt arm having one end portion pivoted to a stationary machine part, and another end portion carrying said workpiece, support and a drive linking said tilt arm with said first means; a pressure-compensation lever, and spring means reacting between a stationary part of the machine and said lever, said lever being a double-armed angled lever having a first arm and a second arm, and said spring means comprising a packet of dished springs on a guide rod and bearing against said second arm so as to resiliently urge said first arm into engagement with said lower end, said angled lever being mounted on a pivot extending from said stationary machine part; and a clamp also mounted on said pivot and circumferentially adjustable thereon to a plurality of different positions in each of which it is arrestable, and an abutment provided on said clamp and cooperating with said tilt arm to limit tilting of the same in dependence upon the position of said clamp relative to said bolt.

* * * * *